United States Patent
Tiple et al.

(10) Patent No.: US 10,203,939 B2
(45) Date of Patent: Feb. 12, 2019

(54) METHOD AND SYSTEM FOR PARAMETER MODEL FRAMEWORK

(71) Applicant: SAP SE, Walldorf (DE)

(72) Inventors: Abhay Tiple, St. Leon-Rot (DE); Markus Dobler, Harthausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/978,250

(22) Filed: Dec. 22, 2015

(65) Prior Publication Data

US 2017/0123769 A1 May 4, 2017

Related U.S. Application Data

(60) Provisional application No. 62/248,504, filed on Oct. 30, 2015.

(51) Int. Cl.
| | |
|---|---|
| G06F 9/44 | (2018.01) |
| G06F 3/048 | (2013.01) |
| G06F 3/00 | (2006.01) |
| G06F 9/46 | (2006.01) |
| G06F 8/38 | (2018.01) |

(Continued)

(52) U.S. Cl.
CPC ............. G06F 8/38 (2013.01); G06F 8/20 (2013.01); G06F 8/35 (2013.01); G06F 9/451 (2018.02); G06F 9/454 (2018.02); *G06F 8/36* (2013.01)

(58) Field of Classification Search
CPC ..... G06F 8/38; G06F 8/20; G06F 8/77; G06F 8/10; G06F 8/35; G06F 8/447; G06F 8/24; G06F 17/2247; G06F 3/0481; G06F 3/048; G06F 8/36; G06F 8/34; G06F 8/65; G06F 9/4443; G06F 9/451; G06F 9/541; G06F 9/54; G06F 17/3056
See application file for complete search history.

(56) References Cited

U.S. PATENT DOCUMENTS

| | | | |
|---|---|---|---|
| 7,062,502 B1* | 6/2006 | Kesler | G06F 17/3056 |
| 7,412,658 B2* | 8/2008 | Gilboa | G06F 8/38 |
| | | | 715/762 |

(Continued)

OTHER PUBLICATIONS

Joel M. Rahman et al., Making frameworks more useable: using model introspection and metadata to develop model processing tools, Oct. 29, 2002, [Retrieved on Sep. 13, 2018]. Retrieved from the internet: <URL: https://ac.els-cdn.com/S1364815203001531/1-s2.0-S1364815203001531-main.pdf?> 10 Pages (275-284) (Year: 2002).*

(Continued)

*Primary Examiner* — Anibal Rivera
(74) *Attorney, Agent, or Firm* — Buckley, Maschoff & Talwalkar LLC (57) ABSTRACT

A system, method, and tangible medium to build a user interface, the system including a backend system supporting processing and persisting of a parameter model defining a user interface, the parameter model specifying user input fields of the user interface to be defined; a user interface framework to render the parameter model to solicit at least one input value for the input fields of the user interface from a user; and a service, distinct from the user interface framework and the backend system, to deliver the parameter model to the user interface framework, the service further to persist the at least one input value from the user.

16 Claims, 13 Drawing Sheets

(51) Int. Cl.
*G06F 8/35* (2018.01)
*G06F 8/20* (2018.01)
*G06F 9/451* (2018.01)
*G06F 8/36* (2018.01)

(56) References Cited

U.S. PATENT DOCUMENTS

| | | | | |
|---|---|---|---|---|
| 7,424,485 B2* | 9/2008 | Kristiansen | ............... | G06F 8/38 |
| 7,451,403 B1* | 11/2008 | Srinivasan | ............... | G06F 8/10 |
| | | | | 715/762 |
| 7,917,888 B2* | 3/2011 | Chong | ............... | G06F 8/20 |
| | | | | 717/102 |
| 8,296,665 B2* | 10/2012 | Stienhans | ............... | G06F 8/38 |
| | | | | 715/762 |
| 9,891,897 B2* | 2/2018 | Sullivan | ............... | G06F 9/451 |
| 2003/0145305 A1* | 7/2003 | Ruggier | ............... | G06F 8/38 |
| | | | | 717/100 |
| 2004/0015819 A1* | 1/2004 | Romano-Critchley | ... | G06F 8/20 |
| | | | | 717/102 |
| 2004/0148586 A1* | 7/2004 | Gilboa | ............... | G06F 8/38 |
| | | | | 717/108 |
| 2004/0153992 A1* | 8/2004 | Molina-Moreno | ....... | G06F 8/35 |
| | | | | 717/105 |
| 2005/0071749 A1* | 3/2005 | Goerke | ............... | G06F 8/38 |
| | | | | 715/205 |
| 2005/0071801 A1* | 3/2005 | Jesse | ............... | G06F 8/34 |
| | | | | 717/100 |
| 2005/0071803 A1* | 3/2005 | Cherdron | ............... | G06F 8/20 |
| | | | | 717/101 |
| 2005/0071805 A1* | 3/2005 | Lauterbach | ............... | G06F 8/20 |
| | | | | 717/104 |
| 2006/0004845 A1* | 1/2006 | Kristiansen | ............... | G06F 8/38 |
| 2006/0074730 A1* | 4/2006 | Shukla | ............... | G06Q 10/06 |
| | | | | 705/7.27 |
| 2006/0074732 A1* | 4/2006 | Shukla | ............... | G06F 8/36 |
| | | | | 717/106 |
| 2006/0074733 A1* | 4/2006 | Shukla | ............... | G06F 8/10 |
| | | | | 717/105 |
| 2006/0074734 A1* | 4/2006 | Shukla | ............... | G06F 8/10 |
| | | | | 717/107 |
| 2006/0074736 A1* | 4/2006 | Shukla | ............... | G06Q 10/06 |
| | | | | 717/100 |
| 2007/0168936 A1* | 7/2007 | Shaburov | ............... | G06F 8/34 |
| | | | | 717/106 |
| 2007/0220035 A1* | 9/2007 | Misovski | ............... | G06F 8/38 |
| 2008/0120593 A1* | 5/2008 | Keren | ............... | G06F 9/451 |
| | | | | 717/105 |
| 2009/0006987 A1* | 1/2009 | Simhi | ............... | G06F 8/24 |
| | | | | 715/762 |
| 2009/0077119 A1* | 3/2009 | Speth | ............... | G06F 8/38 |
| 2010/0077070 A1* | 3/2010 | Baikov | ............... | G06F 8/65 |
| | | | | 709/223 |
| 2010/0131857 A1* | 5/2010 | Prigge | ............... | G06F 8/10 |
| | | | | 715/744 |
| 2010/0242049 A1* | 9/2010 | Li | ............... | G06Q 10/10 |
| | | | | 718/106 |
| 2010/0251133 A1* | 9/2010 | Beringer | ............... | G06F 3/048 |
| | | | | 715/744 |
| 2011/0054970 A1* | 3/2011 | Minsky | ............... | G06Q 10/06 |
| | | | | 705/7.37 |
| 2011/0153624 A1* | 6/2011 | Aigner | ............... | G06F 17/3056 |
| | | | | 707/754 |
| 2011/0239269 A1* | 9/2011 | Wahl | ............... | H04L 63/0815 |
| | | | | 726/1 |
| 2012/0054262 A1* | 3/2012 | Demant | ............... | G06F 9/54 |
| | | | | 709/203 |
| 2012/0054659 A1* | 3/2012 | Demant | ............... | G06F 9/451 |
| | | | | 715/771 |
| 2012/0166977 A1* | 6/2012 | Demant | ............... | G06F 9/451 |
| | | | | 715/762 |
| 2012/0198364 A1* | 8/2012 | Bornheimer | ............... | G06F 8/38 |
| | | | | 715/762 |
| 2012/0198365 A1* | 8/2012 | Bornheimer | ............... | G06F 8/38 |
| | | | | 715/762 |
| 2012/0198368 A1* | 8/2012 | Bornheimer | ............... | G06F 8/38 |
| | | | | 715/763 |
| 2013/0326470 A1* | 12/2013 | Jentsch | ............... | G06F 8/35 |
| | | | | 717/104 |
| 2014/0033168 A1* | 1/2014 | Solovey | ............... | G06F 8/35 |
| | | | | 717/104 |
| 2014/0181703 A1* | 6/2014 | Sullivan | ............... | G06F 9/451 |
| | | | | 715/762 |
| 2014/0237443 A1* | 8/2014 | Pana | ............... | G06F 8/20 |
| | | | | 717/105 |
| 2015/0363090 A1* | 12/2015 | Sarangdhar | ........... | G06F 3/0481 |
| | | | | 715/762 |
| 2017/0031881 A1* | 2/2017 | Chen | ............... | G06F 17/2247 |

OTHER PUBLICATIONS

Sungjoo Kang et al., A Design of the conceptual Architecture for a Multitenant SaaS Application Platform, 2011, [Retrieved on Sep. 13, 2018]. Retrieved from the internet: <URL: https://ieeexplore.ieee.org/stamp/stamp.jsp?tp=&arnumber=5954363> 6 Pages (462-467) (Year: 2011).*

* cited by examiner

| Column Name | Data Type | Description |
|---|---|---|
| NAME | NVARCHAR | Name of the parameter model |
| TEXT_FILE_LOCATION | NVARCHAR | Location of the translation text file |
| TEXT_FILE | NCLOB | Name of the translation text file |

| Column Name | Data Type | Description |
|---|---|---|
| NAME | NVARCHAR | Name of the parameter section |
| MODEL_NAME | NVARCHAR | Name of the parameter model to which the section belongs to |
| ORDINAL_NUMBER | BIGINT | Order of display in the UI in the parameter model |

| Column Name | Data Type | Description |
|---|---|---|
| MODEL_NAME | NVARCHAR | Name of the parameter model |
| SECTION_NAME | NVARCHAR | Name of the parameter section |
| DEPENDENCY_TYPE | NVARCHAR | Type of dependency, e.g. refresh when the dependent upon section/parameter/model refreshes |
| DEPENDS_ON_PARAMETER | NVARCHAR | Specifies on which parameter is the section dependent upon. This is optional. |
| DEPENDS_ON_SECTION | NVARCHAR | Specifies on which parameter section is the section dependent upon. Not optional. |

| Column Name | Data Type | Description |
|---|---|---|
| NAME | NVARCHAR | Name of the parameter |
| SECTION_NAME | NVARCHAR | Name of the parameter section to which the parameter belongs to |
| MODEL_NAME | NVARCHAR | Name of the parameter model |
| DATA_TYPE | NVARCHAR | Data type of the parameter, e.g. NVARCHAR, BIGINT etc. |
| LENGTH | INTEGER | SQL Length of parameter, e.g. NVARCHAR(255) |
| SCALE | INTEGER | SQL Scale of parameter, e.g. DECIMAL(16, 9) |
| CLASS_ID | BIGINT | Class of parameter, e.g. Password Field, Checkbox etc. |
| DEFAULT_VALUE | NCLOB | Default value / placeholder for a parameter |
| MANDATORY_INDICATOR | SMALLINT | Specifies if the parameter is mandatory in the UI |
| READONLY_INDICATOR | SMALLINT | Specifies if the parameter is read-only in the UI |
| MULTIVALUE_INDICATOR | SMALLINT | Specifies if the parameter should be rendered as multi value field on the UI, e.g. a field with semantic type 'Status' which accepts multiple status values |
| SEMANTIC_TYPE | NVARCHAR | An additional indicator for the model provider for providing additional semantic qualifier to the parameter |
| ORDINAL_NUMBER | BIGINT | Order of display in the UI in the parameter section |

| Column Name | Data Type | Description |
| --- | --- | --- |
| NAME | NVARCHAR | Name of the parameter module |
| MODULE_TYPE | NVARCHAR | Type of parameter module, e.g. TYPE_AHEAD, VALUE_HELP etc. |
| PARAMETER_NAME | NVARCHAR | Parameter on which the module is defined |
| SECTION_NAME | NVARCHAR | Name of the parameter section to which the parameter belongs to |
| MODEL_NAME | NVARCHAR | Name of the parameter model |
| IMPLEMENTATION_TYPE | NVARCHAR | The type of implementation of the module, e.g. STORED_PROCEDURE, JAVSCRIPT_FUNCTION etc. |
| LOCATION | NCLOB | Location of the implementation of the module |
| SUBLOCATION | NCLOB | Name of the implementation of the module |

| Column Name | Data Type | Description |
| --- | --- | --- |
| ID | BIGINT | One-up generated number acting as a key of the parameter value record |
| PARAMETER_NAME | NVARCHAR | Name of the parameter from the design time model |
| SECTION_NAME | NVARCHAR | Name of the section from the design time model |
| MODEL_NAME | NVARCHAR | Name of the mode from the design time model |
| VALUE | NCLOB | Value of the parameter as entered by the user/process |
| OWNING_ENTITY | NVARCHAR | Name of the runtime owning entity of the parameter value |
| OWNING_ENTITY_ID | BIGINT | Instance ID of the runtime owning entity |

```
{
    "aDestination": [ //Design time owner of the parameter model
    {
        "ID": 500,
        "NAME": "SYBASEIQ",//Name of the design time owner of the model
        "PARAMETER_MODEL_NAME": "SYBASEIQ_DESTINATION_MODEL"
    }
    },
    "aParameter": [ //Details about the parameters
      {//First parameter            910
        "NAME": "REMOTESOURCE",
        "SECTION_NAME": "DETAILS",
        "MODEL_NAME": "SYBASEIQ_DESTINATION_MODEL",
        "DEFAULT_VALUE": null,
        "DATA_TYPE": "NVARCHAR",
        "LENGTH": 512,
        "SCALE": 0,
        "READONLY_INDICATOR": 0,
        "MULTIVALUE_INDICATOR": 0,            945        940
        "SECTION": "DETAILS",
        "CLASS": null, //Is a default input field
        "DISPLAY_TEXT": "Remote Source", //Translated text
        "SECTION_DISPLAY_TEXT": "Remote Source Details", //Translated text
        "aModule": [ //Details about the modules for the parameters
          {
            "NAME": "REMOTESOURCE_TYPE_AHEAD",
            "MODULE_TYPE": "TYPE_AHEAD", //It is a type ahead module
            "PARAMETER_NAME": "REMOTESOURCE",
            "SECTION_NAME": "DETAILS",
            "MODEL_NAME": "SYBASEIQ_DESTINATION_MODEL",
            "IMPLEMENTATION_TYPE": "XSJSFUNC", //The implementation type is
a backend Javascript function
            "LOCATION": "sap.hdm.dlm.destination.module.sybaseiq.service",
//Package name of the implementation file
            "SUBLOCATION": "typeAhead" //Name of the implementation file
          }
        ]
      },                            925
      {//Second Parameter
        "NAME": "DBNAME",
        "SECTION_NAME": "DETAILS",
        "MODEL_NAME": "SYBASEIQ_DESTINATION_MODEL",
        "DEFAULT_VALUE": null,
        "DATA_TYPE": "NVARCHAR",
        "LENGTH": 512,
        "SCALE": 0,
        "READONLY_INDICATOR": 0,
        "MULTIVALUE_INDICATOR": 0,
        "TYPE_AHEAD_SERVICE": null,    950
        "SECTION": "DETAILS",
        "CLASS": null,
        "DISPLAY_TEXT": "Database Name",
        "SECTION_DISPLAY_TEXT": "Remote Source Details",
        "aModule": [
          {
            "NAME": "DBNAME_TYPE_AHEAD",
            "SEMANTIC_TYPE": "TYPE_AHEAD",
            "PARAMETER_NAME": "DBNAME",
            "SECTION_NAME": "DETAILS",
            "MODEL_NAME": "SYBASEIQ_DESTINATION_MODEL",
```

*FIG. 9A*

```
            "TYPE": "XSJSFUNC",
            "LOCATION": "sap.hdm.dlm.destination.module.sybaseiq.service",
            "SUBLOCATION": "typeAhead"
          }
                          930
      },
      {//Third Parameter
        "NAME": "OWNER",
        "SECTION_NAME": "DETAILS",
        "MODEL_NAME": "SYBASEIQ_DESTINATION_MODEL",
        "DEFAULT_VALUE": null,
        "DATA_TYPE": "NVARCHAR",
        "LENGTH": 512,
        "SCALE": 0,
        "READONLY_INDICATOR": 0,
        "MULTIVALUE_INDICATOR": 0,
        "TYPE_AHEAD_SERVICE": null,        935
        "SECTION": "DETAILS",
        "CLASS": null,
        "DISPLAY_TEXT": "Owner / Schema",
        "SECTION_DISPLAY_TEXT": "Remote Source Details",
        "aModule": [
          {
            "NAME": "OWNER TYPE AHEAD",
            "SEMANTIC_TYPE": "TYPE_AHEAD",
            "PARAMETER_NAME": "OWNER",
            "SECTION_NAME": "DETAILS",
            "MODEL_NAME": "SYBASEIQ_DESTINATION_MODEL",
            "TYPE": "XSJSFUNC",
            "LOCATION": "sap.hdm.dlm.destination.module.sybaseiq.service",
            "SUBLOCATION": "typeAhead"
          }
                          915
      },
      {//Fourth Parameter
        "NAME": "SCHEMA",
        "SECTION_NAME": "OTHERDETAILS", //This parameter has a different
section
        "MODEL_NAME": "SYBASEIQ_DESTINATION_MODEL",
        "DEFAULT_VALUE": "SAP_HDM_DLM_GEN", //Default value of the parameter
        "DATA_TYPE": "NVARCHAR",
        "LENGTH": 256,
        "SCALE": 0,
        "READONLY_INDICATOR": 0,
        "MULTIVALUE_INDICATOR": 0,          965
        "TYPE_AHEAD_SERVICE": null,       960
        "SECTION": "OTHERDETAILS",
        "CLASS": null,
        "DISPLAY_TEXT": "Generated Object(s) Schema",
        "SECTION_DISPLAY_TEXT": "Generation Details",
        "aModule": [
          {
            "NAME": "SCHEMA TYPE AHEAD",
            "SEMANTIC_TYPE": "TYPE_AHEAD",
            "PARAMETER_NAME": "SCHEMA",
            "SECTION_NAME": "OTHERDETAILS",
            "MODEL_NAME": "SYBASEIQ_DESTINATION_MODEL",
            "TYPE": "XSJSFUNC",
            "LOCATION": "sap.hdm.dlm.destination.module.sybaseiq.service",
            "SUBLOCATION": "typeAhead"
          }
      }
    ],
    "aDependencies": []//No dependencies for the parameters in this model
}
```

| NAME | TEXT_FILE_LOCATION | TEXT_FILE |
|---|---|---|
| SYBASEIQ_DESTINATION_MODEL | sap.hdm.dlm.destination.module.sybaseiq.i18n | SybaseIQ |

| NAME | MODEL_NAME | ORDINAL_NUMBER |
|---|---|---|
| DETAILS | SYBASEIQ_DESTINATION_MODEL | 1 |
| OTHERDETAILS | SYBASEIQ_DESTINATION_MODEL | 2 |

FIG. 11

| NAME | SECTI ON_ NAM E | MODEL_NAME | DATA _TYPE | LEN GT H | SC AL E | CLASS _ID | DEFAULT_VA LUE | MAND ATOR Y_IND ICATO R | READONLY _INDICAT OR | MULTIVALU E_INDICAT OR | SEMAN TIC_TY PE | ORDINAL _NUMBE R |
|---|---|---|---|---|---|---|---|---|---|---|---|---|
| REMOTES OURCE | DETA ILS | SYBASEIQ_DES TINATION_MO DEL | NVAR CHAR | 512 | 0 | ? | ? | 1 | 0 | 0 | ? | 1 |
| DBNAME | DETA ILS | SYBASEIQ_DES TINATION_MO DEL | NVAR CHAR | 512 | 0 | ? | ? | 1 | 0 | 0 | ? | 2 |
| OWNER | DETA ILS | SYBASEIQ_DES TINATION_MO DEL | NVAR CHAR | 512 | 0 | ? | ? | 1 | 0 | 0 | ? | 3 |
| SCHEMA | OTHE RDET AILS | SYBASEIQ_DES TINATION_MO DEL | NVAR CHAR | 256 | 0 | ? | SAP_HDM_D LM_GMR | 1 | 0 | 0 | ? | 1 |

| NAME | MODULE_TYPE | PARAMETER_NAME | SECTION_NAME | MODEL_NAME | IMPLEMENTATION_TYPE | LOCATION | SUBLOCATION |
|---|---|---|---|---|---|---|---|
| REMOTESOURCE_TYPE_AHEAD | TYPE_A_HEAD | REMOTESOURCE | DETAILS | SYBASEIQ_DESTINATION_MODEL | XSJSFUNC | sap.hdm.dlm.destination.module.sybaseiq.service | typeAhead |
| DBNAME_TYPE_AHEAD | TYPE_A_HEAD | DBNAME | DETAILS | SYBASEIQ_DESTINATION_MODEL | XSJSFUNC | sap.hdm.dlm.destination.module.sybaseiq.service | typeAhead |
| OWNER_TYPE_A_HEAD | TYPE_A_HEAD | OWNER | DETAILS | SYBASEIQ_DESTINATION_MODEL | XSJSFUNC | sap.hdm.dlm.destination.module.sybaseiq.service | typeAhead |
| SCHEMA_TYPE_A_HEAD | TYPE_A_HEAD | SCHEMA | OTHERDETAILS | SYBASEIQ_DESTINATION_MODEL | XSJSFUNC | sap.hdm.dlm.destination.module.sybaseiq.service | typeAhead |

```
┌─────────────────────────────────────────────────────────┐
│   DEFINE A USER INTERFACE AS A PARAMETER MODEL, THE     │
│   PARAMETER MODEL SPECIFYING USER INPUT FIELDS OF       │
│        THE USER INTERFACE TO BE DEFINED                 │
│                                                    1505 │
└─────────────────────────────────────────────────────────┘
```

```
┌─────────────────────────────────────────────────────────┐
│      DELIVER THE PARAMETER MODEL TO A USER INTERFACE    │
│                      FRAMEWORK                          │
│                                                    1510 │
└─────────────────────────────────────────────────────────┘
```

```
┌─────────────────────────────────────────────────────────┐
│   RENDER THE PARAMETER MODEL IN A USER UNDERSTANDABLE   │
│   FORMAT TO SOLICIT AT LEAST ONE INPUT VALUE FOR THE INPUT │
│     FIELDS OF THE USER INTERFACE FROM A USER            │
│                                                    1515 │
└─────────────────────────────────────────────────────────┘
```

```
┌─────────────────────────────────────────────────────────┐
│   PERSIST THE AT LEAST ONE INPUT VALUE FROM THE USER    │
│              IN A DATA STORAGE FACILITY                 │
│                                                    1520 │
└─────────────────────────────────────────────────────────┘
```

METHOD AND SYSTEM FOR PARAMETER MODEL FRAMEWORK

BACKGROUND

In some aspects, different applications may often experience a similar repeated pattern of accepting user inputs and displaying them. This repeated pattern of interaction between a user and different applications may be observed particularly with respect to transactional applications. Based on the requirements of the different applications, the user patterns of interaction might vary to some extent. However, a significant core of interactions may be the same or similar across the different applications. In this manner, there might be a certain amount of duplication of user interface (UI) development across the spectrum of the different applications.

There thus exists a need and a desire to provide a mechanism to facilitate the development of user interfaces for different applications, including mechanisms that are efficient and consistent across the different applications.

BRIEF DESCRIPTION OF THE DRAWINGS

FIGS. 9A and 9B are illustrative depictions of an encoding of a parameter model, in accordance with some embodiments herein;

DETAILED DESCRIPTION

The present disclosure presents, in some embodiments, methods and apparatuses that facilitate the building of parameter user interfaces (UIs) in a model driven manner. In some embodiments, the parameter UIs built using aspects of the present disclosure are provided by a framework wherein a backend system is decoupled from a user interface frontend, while providing a standardized experience for end users across multiple different applications having their UI built based on the model-driven parameter model framework herein.

In some aspects, the present disclosure focuses on the modeling, display and storage of various user input fields (i.e., parameters) that an application may expose via a UI. As used herein, a user input field is referred to as a "parameter" for a UI. In some aspects, parameters of parameter model defining a UI herein can be specified by a developer or other entity during a designtime (DT) and at least one input value can be obtained from an end user during a runtime (RT) that uses the parameter model. The at least one input value corresponds to the parameters of the parameter model defined during the DT.

Figure 1:
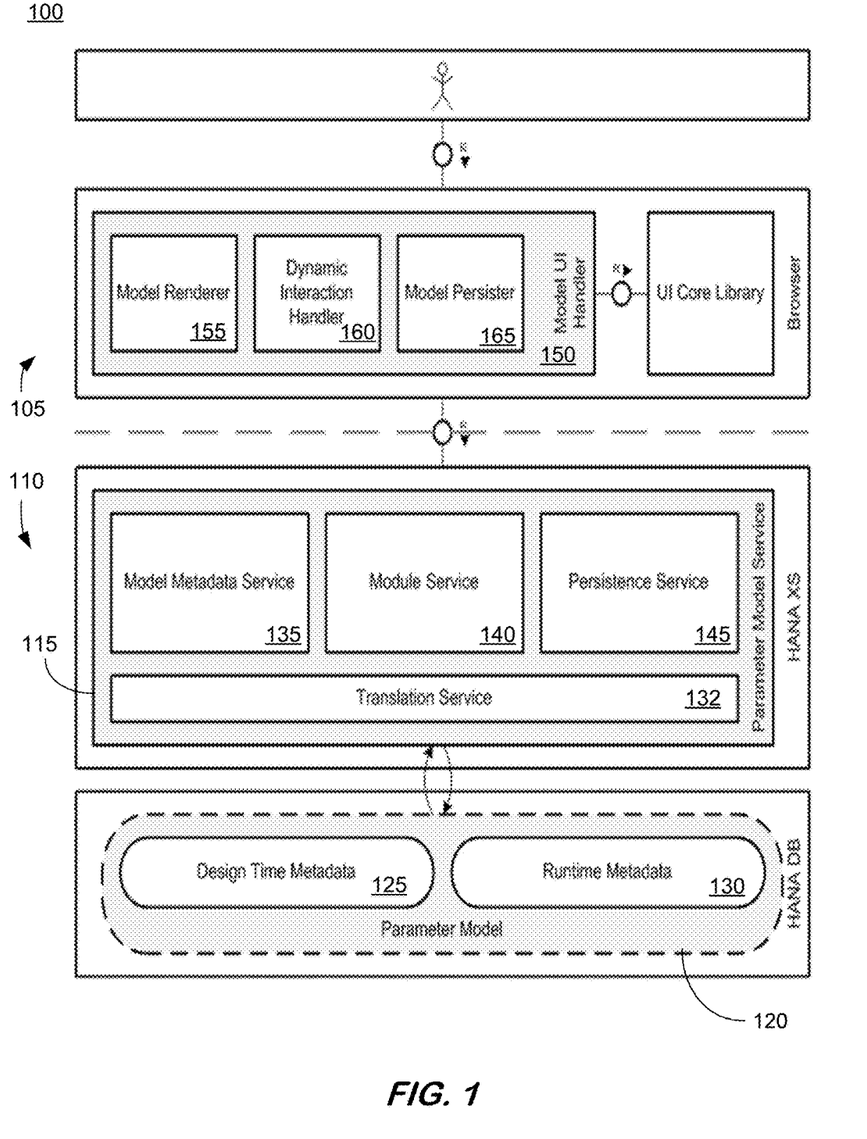
FIG. 1 is an illustrative depiction of a logical architecture for a system supporting some embodiments herein.

To address concepts and aspects of a parameter model framework herein, two main components are proposed as shown in FIG. 1. A platform architecture or framework 100 in accordance with the present disclosure may include a backend component 105 and a frontend component 110. The backend 110 may include a parameter model 120. Backend 110 may be implemented by one or more instances (e.g., nodes) of a database system. In some embodiments, the database system may include an in-memory database, comprising a plurality of nodes. Parameter model 120 may be represented by numerous entries in database tables. In particular, a database implementing and supporting a parameter model herein can include database table entries representing design time (DT) metadata 125 that describes and specifies a model of a UI to be designed. The DT metadata may be specified by a UI developer, in some aspects herein. Parameter model 120 also includes runtime (RT) metadata 130. RT metadata 130 can include database table entries representing instances of a set of data corresponding to a RT use of a parameter model data structure defined during the DT. describes and specifies a model of a UI to be designed. The DT metadata may be specified by a UI developer, in some aspects herein. The RT metadata may include indications of end user specified values for at least one parameter of the parameter model.

Framework 100 also includes a frontend UI framework 150. The UI framework 150 may consume the parameter model services provided by a parameter model service 115. Model service 115 includes a plurality of services to coordinate functions and communication between parameter model 120 of backend 110 and frontend 105. Frontend 105 may further render an instance of a UI as defined by a parameter model herein. The rendered parameter model may solicit or request input values from an end-user based on the parameter model defined for the application. FIG. 1 is an illustrative depiction of a logical architecture 100 to support the processes and systems disclosed herein. In some aspects, hardware, software, and combinations thereof may be combined in various configurations to implement aspects, systems, and processes herein through embodiments including at least portions of 100.

In addition to the parameter model 120 including the DT metadata 125 and the RT metadata 130, backend 110 includes the parameter model service 115 that provides services that may provide the UI and the applications with the capability to access the DT metadata (Model Metadata Service 135), parameter module invocation capabilities (Module Service 140), and the reading and persisting of parameter values (Persistence Service 145). In some aspects and based on a text language file specification of individual models in a "ParameterModel" table, a translation service may provide an automated translation for, as an example, section header text and parameter texts using Translation Service 132, in accordance with some embodiments herein.

Referring again to the parameter model described above with respect to FIG. 1, a generic framework for visualizing the model in the UI is added to the technology stack by virtue of the Frontend Parameter Model UI Handler 150. The various components of this handler are described below.

Model renderer 155 may be responsible for displaying/translating the parameter model into appropriate UI Controls. Those controls may be either simple controls (e.g., input fields of a single value) with representing scalar values or also complex ones (e.g. tables, lists, etc).

In some embodiments, a dynamic interaction handler 160 of frontend 105 includes dynamic event handlers based on the "ParameterModelSectionDependency" as specified/defined the parameter model to enrich the controls that render the predefined model. For example, based on user interactions with a rendered UI as specified by a parameter model, the corresponding controls can be adapted or configured in response to user selections (e.g., selection of single items in list, select/unselect of checkboxes). In some embodiments, those changes can also be interpreted by the handler in the way to update other dependent controls.

In some instances, after a user finishes an interaction with a rendered UI, it is possible to store/translate the frontend based UI values in a RT persistence for a parameter model using the parameter model services 115. In some embodiments, storing and translating of user input values as a RT persistence can include one or more of verification checks and conversions, if necessary. Model persister 165 may facilitate the storing and translating of UI values.

Figure 2:
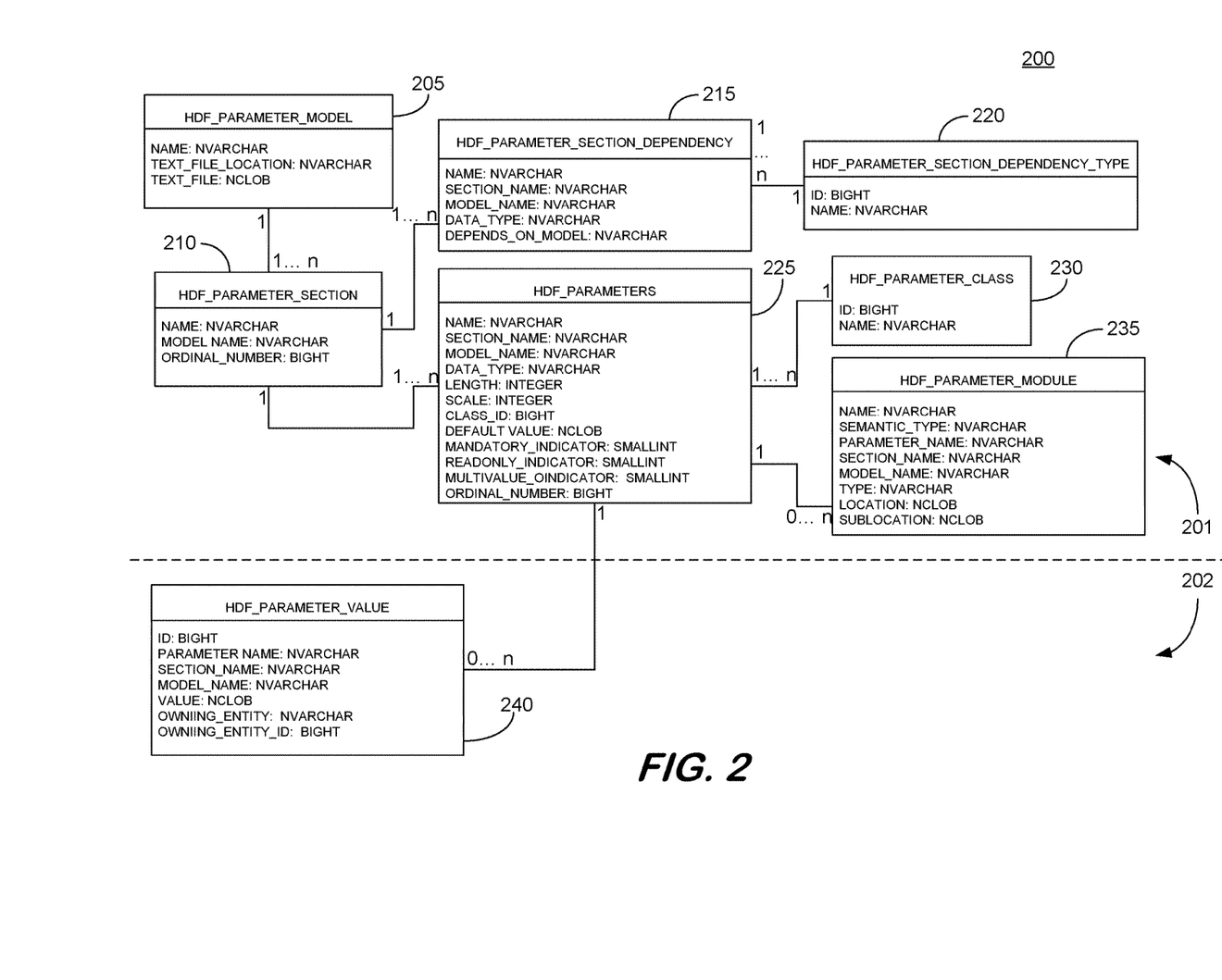
FIG. 2 is an illustrative depiction of a parameter model, in accordance with some embodiments herein.

Regarding a parameter model specified by the backend, applications may have the capability to specify the parameter models for their respective application UIs using the parameter model metadata 120. FIG. 2 shows the various components of a database design for a parameter model, in accordance with some embodiments herein.

FIG. 2 is an illustrative logical depiction of a parameter model, in accordance with some embodiments herein. In some aspects, an application (or other entity) may specify parameter model(s) for their respective UIs using parameter model metadata. FIG. 2 shows various components of parameter model metadata 200, including a logical organization of the metadata to define the parameter model.

In the example of FIG. 2, parameter model metadata 200 includes RT metadata 202 and DT metadata 204. The designtime (DT) portion 202 of the parameter model metadata includes, inter alia, a ParameterModel 205, a ParameterModelSection 210, a ParameterModelSectionDependency 215, a ParameterModelSectionDependencyType 220, a Parameter 225, ParameterClass 230, and ParameterModule tables/structure 235. The runtime portion 204 of the parameter model metadata includes a ParameterValue table 240 where the values for a UI defined by a parameter model defined and specified by the DT metadata are represented by the RT metadata 204 of the parameters are stored generically and centrally as, for example, database table entries.

In some embodiments, applications can specify their model definition via entries in the parameter model DT tables, such as those shown at 205-235. Illustrative DT tables are presented below, as an example of some embodiments. It is noted that other types and configurations of data structures may be used to represent the DT metadata.

Figure 3:
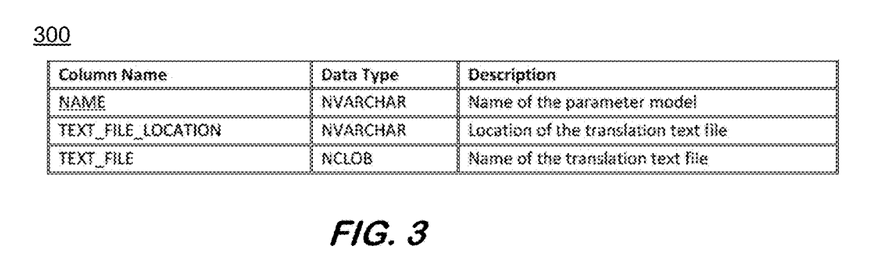
FIG. 3 is a illustrative depiction of some aspects of a parameter model herein.

Referring to FIG. 3, there is shown an example "ParameterModel" table 300. "ParameterModel" 300 contains the name of a concrete (i.e., actual) UI model. "ParameterModel" table 300 also contains the path of the text language files associated with the "ParameterModel" table. "ParameterModel" table 300 contains and organizes data therein in rows and columns.

Figure 4:
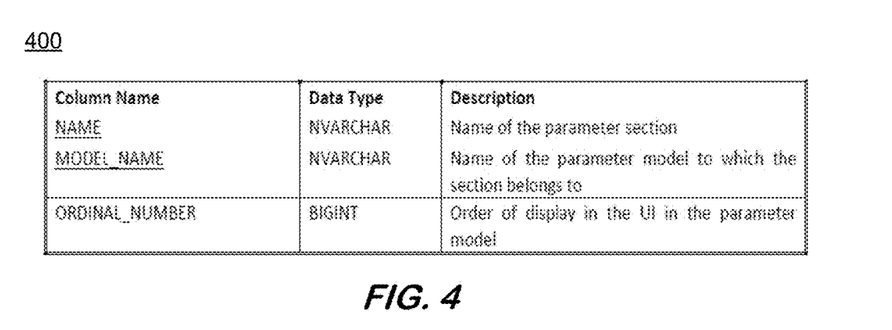
FIG. 4 illustrative depiction of some aspects of a parameter model section, in accordance with some embodiments herein.

FIG. 4 is an illustrative depiction of a "ParameterModelSection" table 210: The "ParameterModelSection" data structure contains the various sections belonging to a model defined in ParameterModel 205. Illustrative examples of the fields of the table are shown in FIG. 3.

Figure 5:
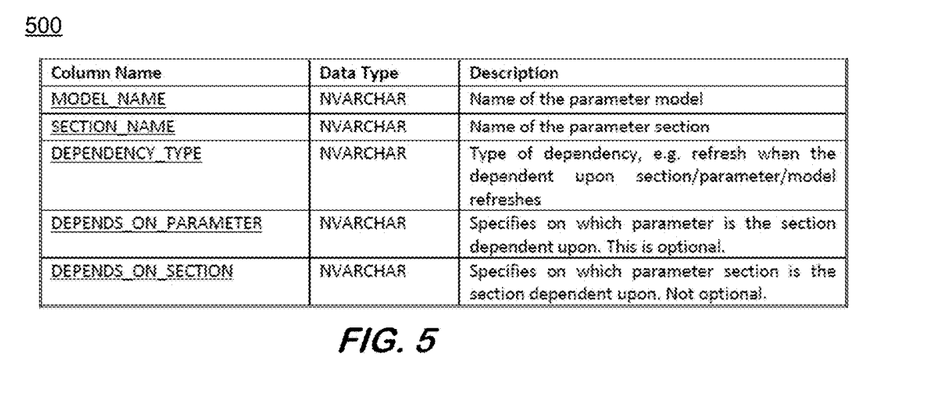
FIG. 5 illustrative depiction of some aspects of a parameter model section dependency, in accordance with some embodiments herein.

FIG. 5 includes an example of a "ParameterModelSectionDependency" table 500. Table 500 contains the specification of the dependencies between different sections (e.g., refresh, visibility, etc.). The "ParameterModelSectionDependency" provides a mechanism for applications to specify, for example, which section should be dynamically visible on the UI when one user control (e.g., a checkbox) from another section is clicked. In some aspects, the "ParameterModelSectionDependency" provides a mechanism to enable making a more interactive UI. Example fields of a "ParameterModelSectionDependency" table are shown in FIG. 5.

Figure 6:
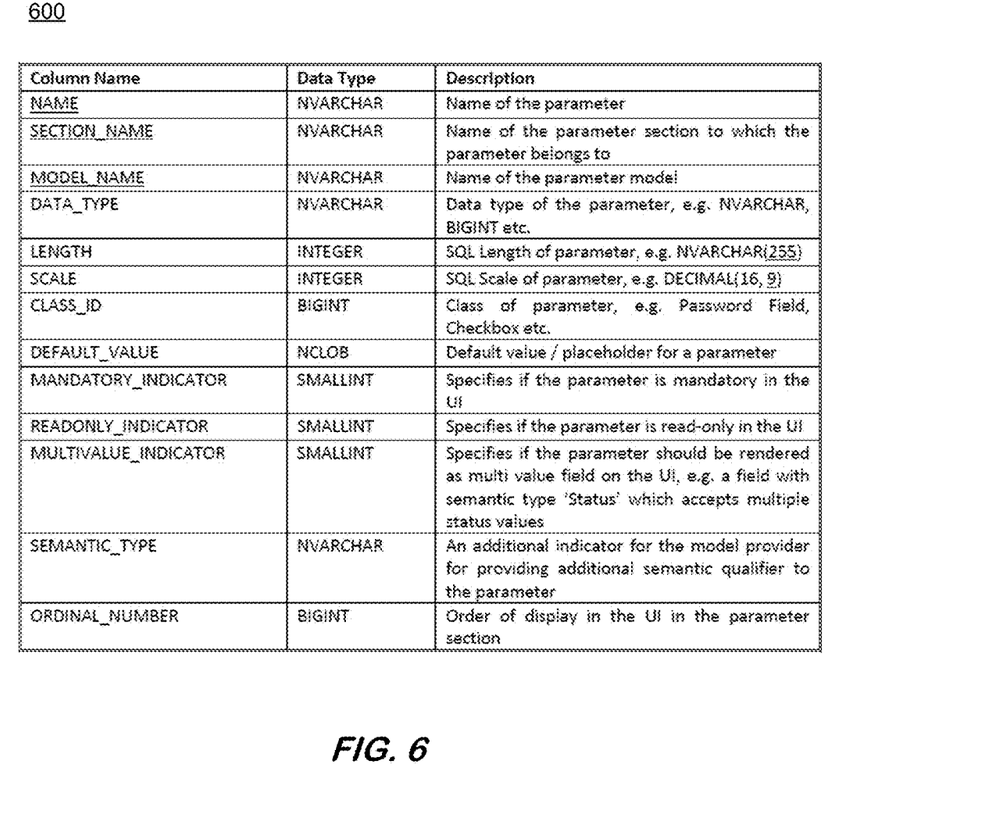
FIG. 6 illustrative depiction of some aspects of a parameter model specifying a parameter, in accordance with some embodiments herein.

FIG. 6 is a further example of a data structure for representing metadata of a parameter model, in accordance with some embodiments herein. FIG. 6 includes an example of a "Parameter" table 600. "Parameter" table 600 contains a variety of parameters and their details (e.g., name, data type, length, class (password field, input field, dropdown field, etc.) belonging to a parameter section defined in the "ParameterModelSection" (e.g., 400, 210). Some example fields of a "Parameter" table are shown in FIG. 6.

Figure 7:
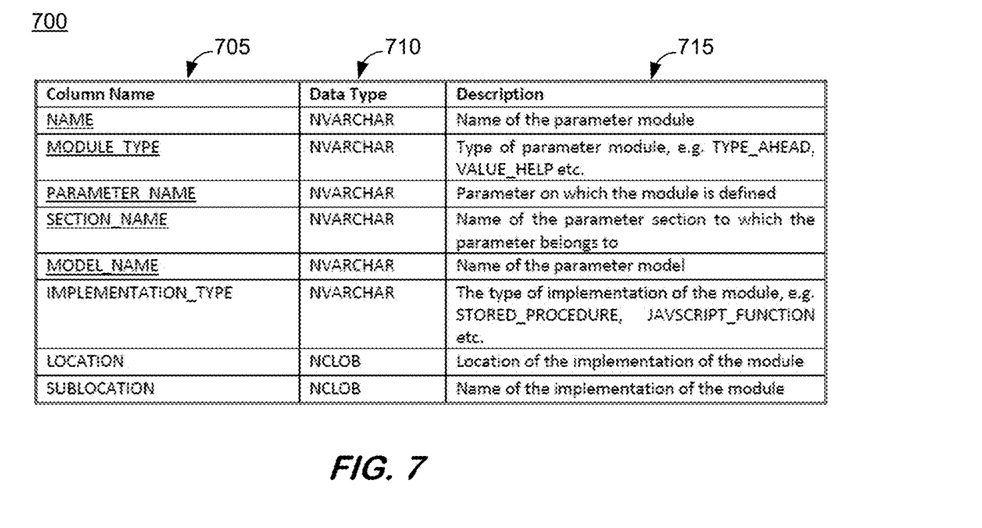
FIG. 7 illustrative depiction of some aspects of a parameter module, in accordance with some embodiments herein.

A "ParameterModule" table 700 is shown in FIG. 7. FIG. 7 contains a specification of the different modules assigned to a parameter, as defined in "Parameter" table 700. Modules herein are backend functions that can implement a fixed interface. In some aspects, the Paramater Module disclosed herein may provide a mechanism to define and model backend execution modules for UI interactions associated with the model-based parameters. The Parameter Module can be used DT table to define and model UI interaction controls and/or features. While the defining and modeling of UI modules occurs on the backend during a DT, the UI interactions occur in the frontend (i.e., via a Web browser, etc.) between a user and the UI of the system. In some embodiments, examples of a backend execution module(s) that may be defined and modeled for a UI interaction can include a type ahead service, a drop-down fill service, value help service, and other UI features on parameter level. In some aspects, a Parameter Module herein may facilitate and support a flexible and veratile mechanism to define and specify backend execution modules.

Referring to FIG. 7, Parameter Module 700 includes, as an example, a column 705 to contain the name of a particular UI interaction to be defined and modeled; a column 710 to include a specificification of the type of (acceptable) data for the particular UI interaction; and a description column 715 that provides a mechanism for including a descriptive textual listing of what the corresponding (i.e., particular) UI interaction is.

In some embodiments, a "ParameterModule" can be associated with or belong to a parameter that could be generically called by the UI for more advanced interactions on the parameter (e.g., type ahead modules, value help modules, etc.). The fields of an example "ParameterModule" table 700.

Figure 8:
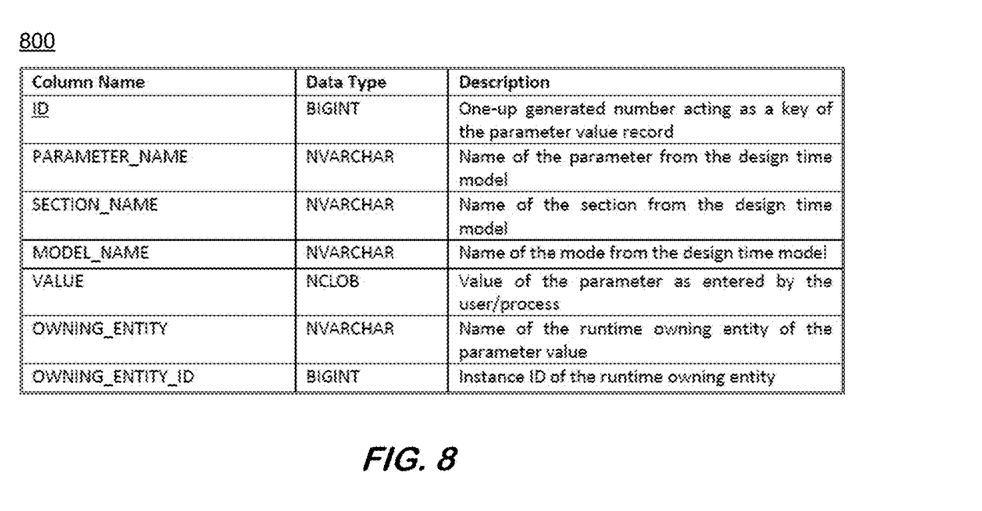
FIG. 8 is an illustrative depiction of some aspects of specifying a runtime persistence, in accordance with some embodiments herein.

Regarding the RT aspects of the metadata defining a parameter model in some embodiments herein, a RT Persistence is specified as shown in FIG. 8. An application may save the values of the parameters as entered/provided by an end-user to "ParameterValue" table (e.g., through a save call or other mechanism). In some aspects, "ParameterValue" table (e.g., 800, FIG. 2, 240) can save a reference to a concrete "Parameter" and the value(s) thereof (i.e., a specific set of data or instance). "ParameterValue" table 800 also shows that an application to save the parameter values can have a dedicated runtime owner for the parameter values. In this manner, parameter values of multiple models may be stored under one single encompassing runtime entity. The runtime owner specification includes the runtime entity name, the runtime entity ID, and other fields of the "ParameterValue" as shown in FIG. 7.

FIGS. 9A and 9B include an illustrative depiction of an encoding of a parameter model, in accordance with some embodiments herein. In particular, shown is a JSON (JavaScript Object Notation) snippet showing the data structure for a parameter model ('SYBASEIQ_DESTINATION_MODEL') at 305 as sent to the UI frontend for rendering, for an application dealing with data storage destinations. The example of FIGS. 9A and 9B specifically specifies the metadata of a storage destination (e.g., SAP IQ). The illustrated parameter model includes two sections. In a first section 'DETAILS' at 310, the parameters Remote Sources at 345, Database Name at 350, and Owners at 330 have auto complete support integrated. In a second section, 'OTHER-DETAILS' at 315, the default value of the parameter 'SCHEMA' is also defined at 335 as part of the model. Other details including for example the data type, read only characteristics, etc. can be seen on the parameter level.

In some aspects, a database representation of the parameter model specified in FIGS. 9A and 9B is provided in FIGS. 10-13.

Figure 10:
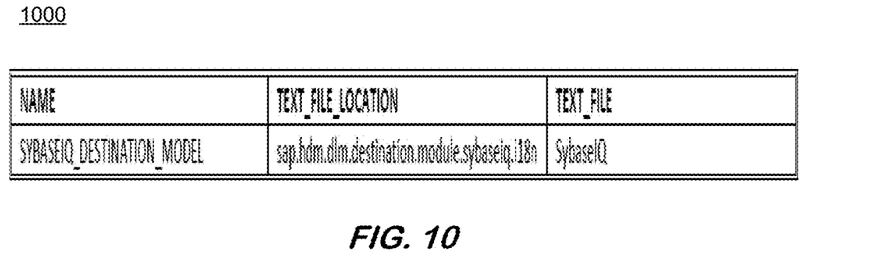
FIG. 10 is an illustrative database representation of a parameter model, in accordance with some embodiments herein.

FIG. 10 is an illustrative database representation of a parameter model, in accordance with some embodiments herein. Shown are the name, text file location, and text file for the "ParameterModel"."

Figure 11:
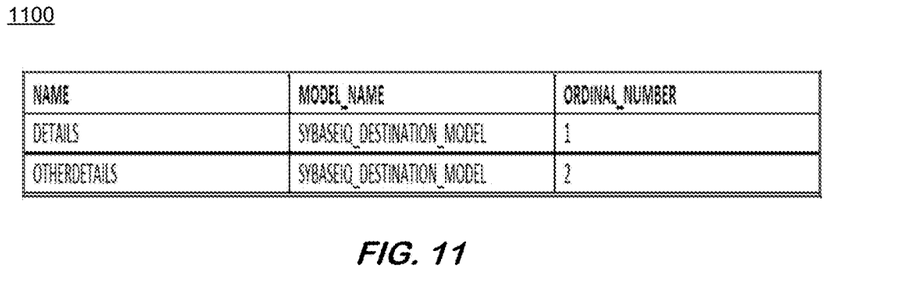
FIG. 11 is an illustrative database representation of a parameter section, in accordance with some embodiments herein.
Figure 12:
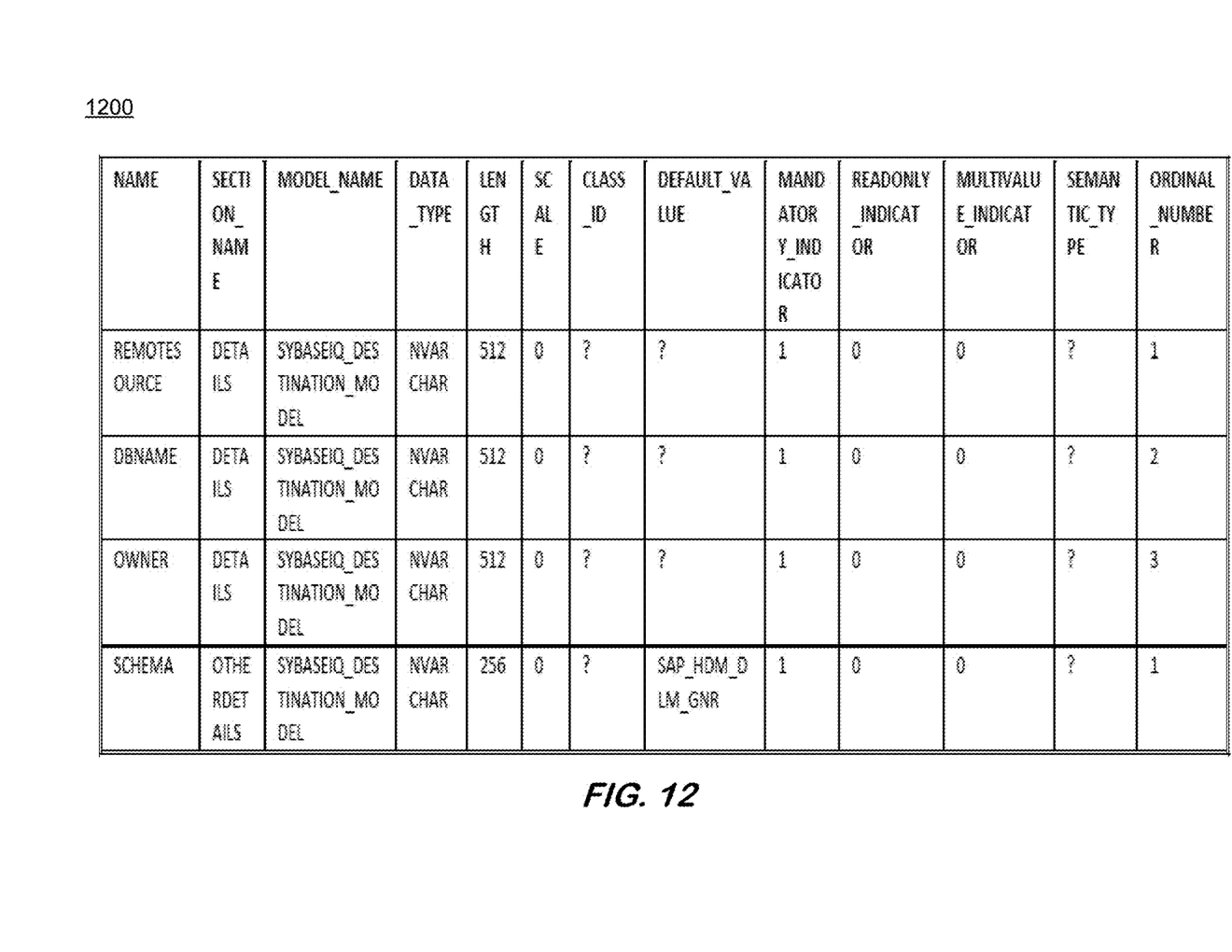
FIG. 12 is an illustrative database representation of a parameter model, in accordance with some embodiments herein.
Figure 13:
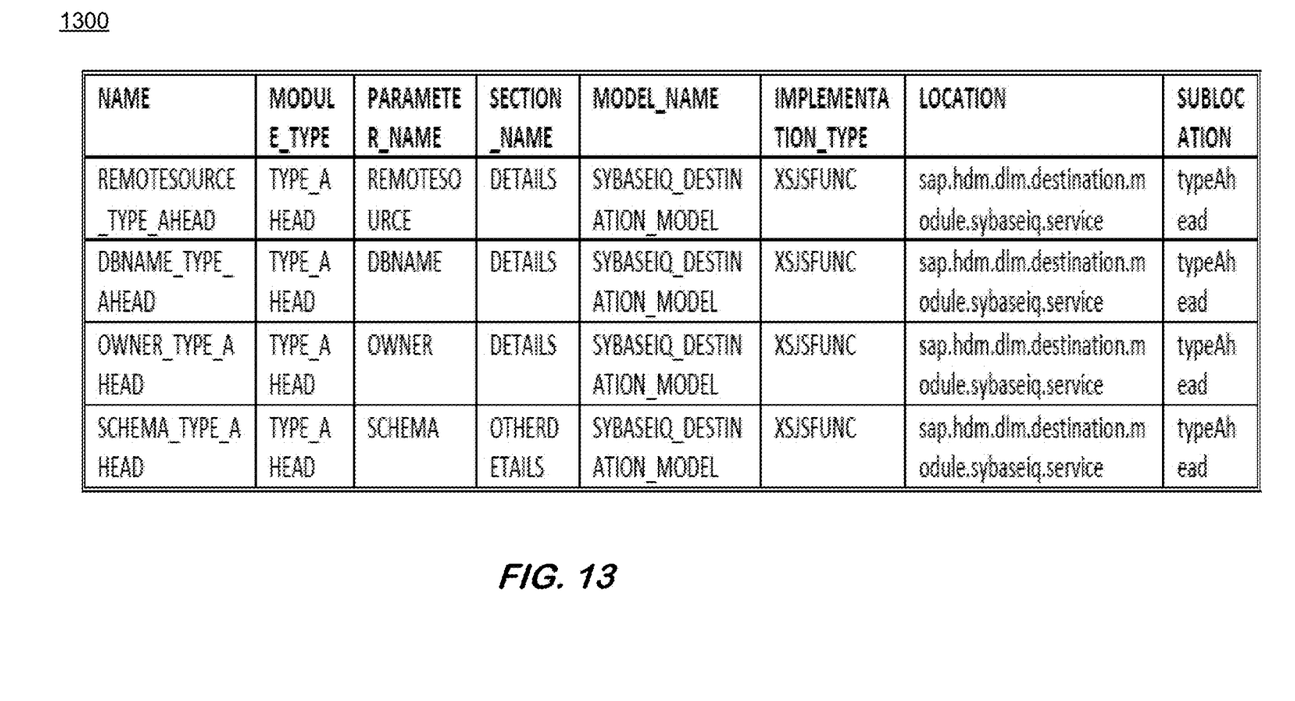
FIG. 13 is an illustrative database representation of a parameter module specification, in accordance with some embodiments herein.

FIG. 11 is an illustrative database representation of a "ParameterSection", in accordance with some embodiments herein. FIG. 12 is an illustrative database representation of a "Parameter" and FIG. 13 is an illustrative database representation of a "ParameterModule" specification, in accordance with some embodiments herein.

Figure 14:
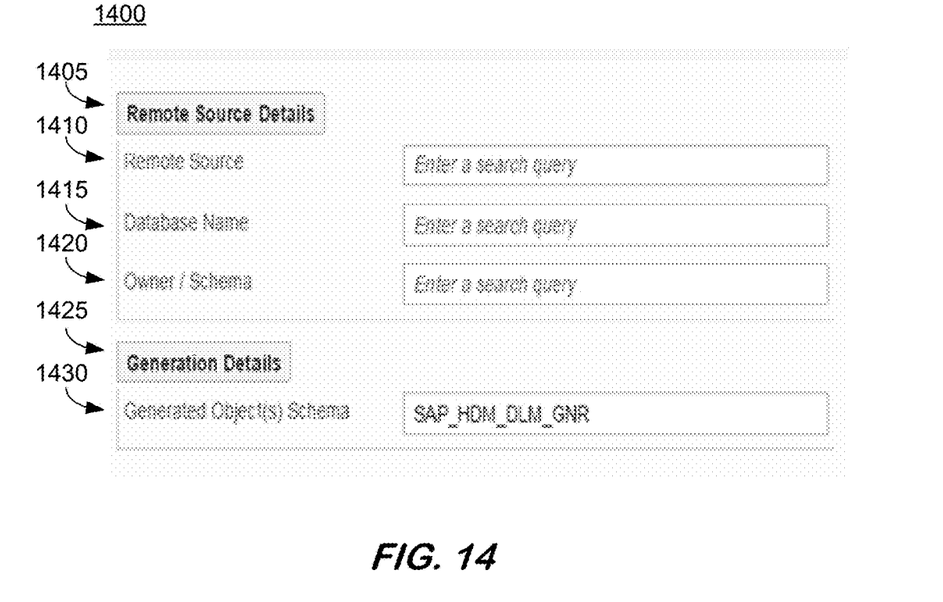
FIG. 14 is an illustrative depiction of a rendering of a parameter model, in accordance with some embodiments herein.

FIG. 14 is an illustrative depiction of a rendering of a parameter model, in accordance with some embodiments herein. The rendered UI corresponds to the example parameter model specified in FIGS. 9A, 9B, and 10-13. For example, parameter 1405 in FIG. 14 corresponds to the specification of same in FIG. 9A at 940 under the first parameter 910, as specified in the table of FIG. 12. Likewise, parameter 1410 is shown at 945, as specified in the table of FIG. 12; parameter 1415 is listed at 950 under the second parameter 925, as specified in the table of FIG. 12; parameter 1420 is seen at 935 of FIG. 9B under the third parameter 930, as specified in the table of FIG. 12; section heading 1425 is listed at 960 under the fourth parameter 915; and parameter 1430 is specified at 965 under the fourth parameter 915, as specified in the table of FIG. 12. FIG. 13 further includes specification details for the parameters defined in the parameter model listing of FIGS. 9A and 9B.

Figure 15:
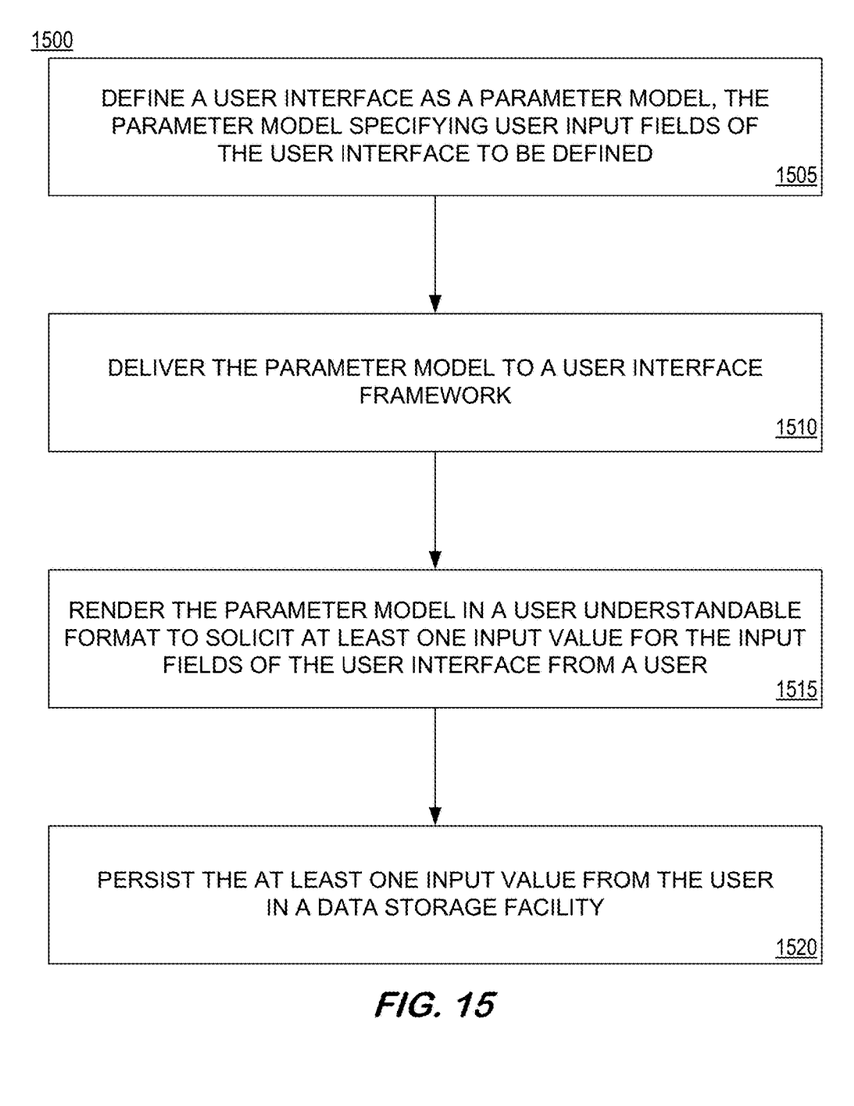
FIG. 15 is a logical flow diagram, in accordance with some embodiments herein.

FIG. 15 is an illustrative depiction of a flow diagram for a process 1500, in accordance with some embodiments herein. Process 1500 is shown starting with an initial operation of 1505. In some embodiments, one or more operations may occur before operation 1505 that, at least in part, facilitate the execution of process 1500. For example, an operation to specify user interface guidelines for one or more applications or services that may be built using a parameter framework as disclosed herein may occur before operation 1505.

At operation 1505, a user interface is defined as a parameter model. That is, the user interface being defined is represented as a parameter model where the parameter model is a data structure specifying user input fields of the user interface being defined. A user interface developer (or other entity) having knowledge of UIs may specify the particular parameters to be included in the parameter model.

Process 1500 continues to operation 1510 where the parameter model defined at operation 1505 is delivered to a user interface framework. As previously discussed, the UI framework may comprise a frontend of a system through which a user interacts with a framework to build a UI based on a model-based representation of the parameters defining a UI and the values for the UI parameters.

At operation 1515, the parameter model may be rendered to a user in a user understandable format to solicit at least one input value for the input fields of the user interface from a user. The frontend of a UI framework herein may present a generic visualization of the UI as defined by the parameter model to an end-user via a browser, for example, and request the user provide values for one or more parameters. In some aspects, a translation service may operate or otherwise be responsible for returning the UI labels of parameters and section in the language corresponding to the users UI locale.

At operation 1520, the at least one input value from the user may be persisted in a data storage facility. In some aspects, the storage facility may be a database system or an aspect therein.

In some embodiments, a developer of a UI control need not be concerned about where the individual fields are filled with data, as the generic services facilitate the corresponding backend calls.

In some embodiments, one or more aspects of the parameter model service disclosed herein can provide technological advantages, improvements, and efficiencies, including but not limited to a Model based specification of application interaction and UI intents, a consistent user experience across different applications (e.g., a same or similar behavior, low/same learning curve, etc.) and a consistent error handling strategy for the different applications having the same or similar UI. In some regards, the present disclosure can provide a central point of adherence regarding fulfillment of product standards by building multiple applications and/or services completely on a same UI "standard". In some embodiments, an application having a UI built in accordance with the framework disclosed herein may be pre-delivered with a set of widely used controls (e.g. Drop-Downs, Input Fields. Tables, Checkboxes) and may be extensible with other UI controls, not only those that are currently included in the application or service.

In some embodiments herein, a backend parameter model and a frontend handler are completely decoupled from each other. In some embodiments, a model services layer may facilitate and support communication between the backend and the frontend of the framework.

Aspects of the processes, systems, and services discussed hereinabove may be implemented through any tangible implementation of one or more of tangible software, firmware, hardware, and combinations thereof, including processor executable instructions embodied on one or more types of media and executable by apparatuses including processors.

Figure 16:
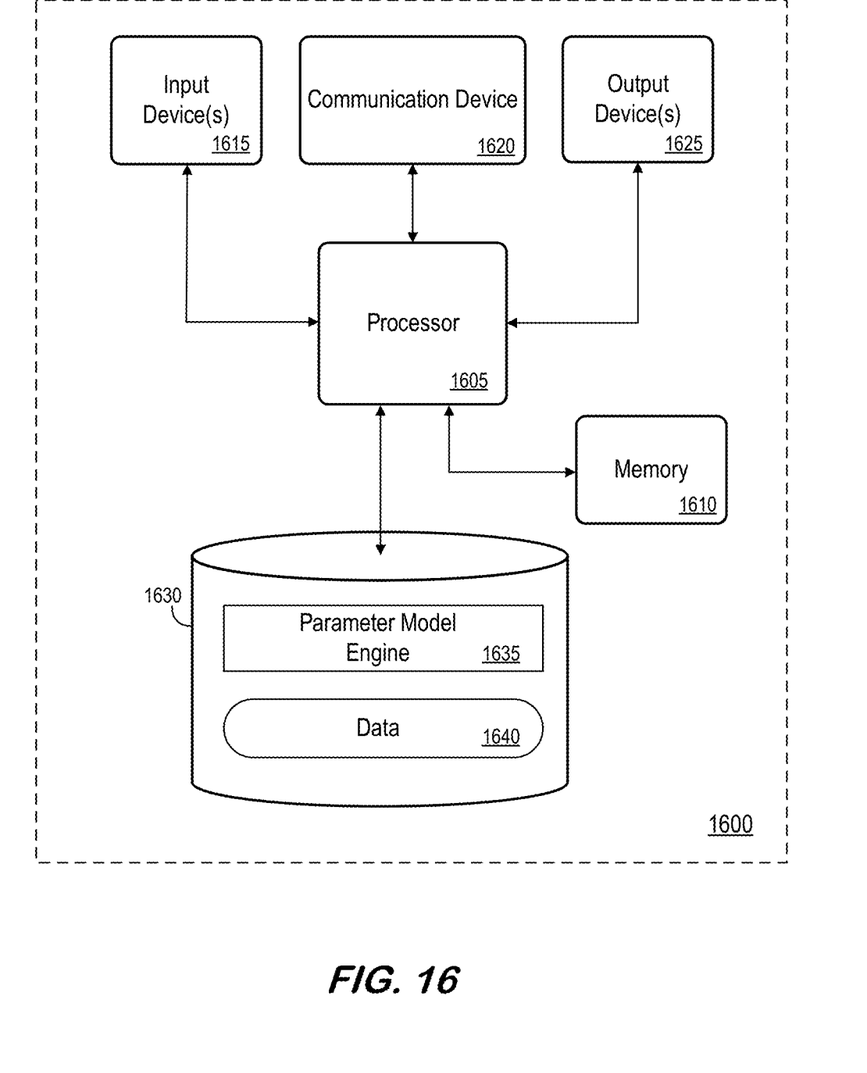
FIG. 16 is a schematic block diagram of a system, in some embodiments herein.

FIG. 16 is a block diagram of a system or apparatus 1600 according to some embodiments. System 1600 may be, for example, associated with devices for implementing a platform and or processes disclosed herein. System 1600 comprises a processor 1605, such as one or more commercially available Central Processing Units (CPUs) in the form of one-chip microprocessors or a multi-core processor, coupled to a communication device 1620 configured to communicate via a communication network (not shown in FIG. 16) to another device or system. In the instance system 1600 comprises a device or system, communication device 1620 may provide a mechanism for system 1600 to interface with an entity (e.g., an application, device, system, or service). System 1600 may also include a cache 1610, such as RAM memory modules. The system may further include an input device 1615 (e.g., a touchscreen, mouse and/or keyboard to enter content) and an output device 1625 (e.g., a touchscreen, a computer monitor to display, a LCD display).

Processor 1605 communicates with a storage device 1630. Storage device 1630 may comprise any appropriate information storage device, including combinations of magnetic storage devices (e.g., a hard disk drive), optical storage devices, solid state drives, and/or semiconductor memory devices. In some embodiments, storage device 1630 may comprise a cache management engine, including in some configurations an in-memory database.

Storage device 1630 may store program code or instructions 1635 that may provide processor executable instructions for building model-based UIs, in accordance with processes herein. Processor 1605 may perform the instructions of the program instructions for parameter model engine 1635 to thereby operate in accordance with any of the embodiments described herein. Program instructions 1635 may be stored in a compressed, uncompiled and/or encrypted format. Program instructions for parameter model engine 1635 may furthermore include other program elements, such as an operating system, a database management system, and/or device drivers used by the processor 1605 to interface with, for example, other systems, devices, and peripheral devices (not shown in FIG. 16). Storage device 1630 may also include data 1640. Data 1640 may be used by system 1600, in some aspects, in performing one or more of the processes herein, including individual processes, individual operations of those processes, and combinations of the individual processes and the individual process operations.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Aspects of the processes, systems, and services discussed hereinabove may be implemented through any tangible implementation of one or more of tangible software, firmware, hardware, and combinations thereof, including processor executable instructions embodied on one or more types of media and executable by apparatuses including processors.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations.

What is claimed is:

1. A method to build a user interface, the method comprising:
    defining a user interface as a parameter model by a developer, the parameter model being a data structure of a plurality of entries in database tables persisted by a backend system representing design time metadata specifying user input fields of the user interface to be defined by the parameter model;
    delivering the parameter model to a frontend system of a user interface framework via a parameter model service of the backend system, the frontend system being decoupled from the backend system and the parameter model service to coordinate communication between the frontend system and the backend system;
    rendering, by the frontend system, the parameter model to present a generic visualization of the user interface in a user understandable format to solicit, from a frontend user, at least one input value for the input fields of the user interface specified by the parameter model design time metadata;
    persisting, after receiving the solicited at least one input value for the input fields of the user interface specified by the parameter model, the at least one input value solicited from the frontend user in a data storage facility as runtime metadata; and
    using, by an application, the persisted runtime metadata and the parameter model with the design time metadata to define and build a user interface for the application.

2. The method of claim 1, further comprising providing, by the parameter model service, a translation of text used to specify the user input fields of the user interface to be defined and text presented to the user during the rendering of the parameter model.

3. The method of claim 1, wherein the at least one input value is persisted as a database table entry in the data storage facility.

4. The method of claim 1, wherein a dedicated owner is specified for the persistence of the at least one input value for the parameter model and different instances of the parameter model can be owned by a plurality of different dedicated owners.

5. The method of claim 1, wherein the parameter model service is distinct from the user interface framework and a backend system supporting the parameter model delivers the parameter model to the user interface framework.

6. The method of claim 1, wherein the at least one input value from the user is persisted as a runtime persistence to be used by the application during a runtime.

7. A system having a processor, the system comprising:
- a backend system supporting processing by a first processor and persisting of a parameter model defining a user interface as specified by a developer, the parameter model being a data structure of a plurality of entries in database tables representing design time metadata specifying user input fields of the user interface to be defined by the parameter model;
- a frontend system, decoupled from the backend system, to render the parameter model, by a second processor, to present a generic visualization of the user interface in a user understandable format and to solicit, from a frontend user, at least one input value for the input fields of the user interface specified by the parameter model design time metadata;
- a parameter model service of the backend system to deliver, by the second processor, the parameter model to the frontend system, the frontend system being decoupled from the backend system and the parameter model service to coordinate communication between the frontend system and the backend system; the parameter model service to persist, after receiving the solicited at least one input value for the input fields of the user interface specified by the parameter model, the at least one input value solicited from the frontend user in a data storage facility as runtime metadata; and
- an application to use the persisted runtime metadata and the parameter model with the design time metadata to define and build a user interface for the application.

8. The system of claim 7, further comprising providing, by the parameter model service, a translation of text used to specify the user input fields of the user interface to be defined and text presented to the user during the rendering of the parameter model.

9. The system of claim 7, wherein the at least one input value is persisted as a database table entry in the data storage facility.

10. The system of claim 7, wherein a dedicated owner is specified for the persistence of the at least one input value for the parameter model and different instances of the parameter model can be owned by a plurality of different dedicated owners.

11. The system of claim 7, wherein the at least one input value from the user is persisted as a runtime persistence to be used by the application during a runtime.

12. A non-transitory computer-readable medium having processor-executable instructions stored thereon, the medium comprising:
- instructions to define a user interface as a parameter model by a developer, the parameter model being a data structure of a plurality of entries in database tables persisted by a backend system representing design time metadata specifying user input fields of the user interface to be defined by the parameter model;
- instructions to deliver the parameter model to a frontend system of a user interface framework via a parameter model service of the backend system, the frontend system being decoupled from the backend system and the parameter model service to coordinate communication between the frontend system and the backend system;
- instructions to render, by the frontend system, the parameter model to present a generic visualization of the user interface in a user understandable format to solicit, from a frontend user, at least one input value for the input fields of the user interface specified by the parameter model design time metadata;
- instructions to persist, after receiving the solicited at least one input value for the input fields of the user interface specified by the parameter model, the at least one input value solicited from the frontend user in a data storage facility as runtime metadata; and
- instructions to use, by an application, the persisted runtime metadata and the parameter model with the design time metadata to define and build a user interface for the application.

13. The medium of claim 12, further comprising instructions to provide, by the parameter model service, a translation of text used to specify the user input fields of the user interface to be defined and text presented to the user during the rendering of the parameter model.

14. The medium of claim 12, wherein the at least one input value is persisted as a database table entry in the data storage facility.

15. The medium of claim 12, wherein a dedicated owner is specified for the persistence of the at least one input value for the parameter model and different instances of the parameter model can be owned by a plurality of different dedicated owners.

16. The medium of claim 12, wherein the at least one input value from the user is persisted as a runtime persistence to be used by the application during a runtime.

* * * * *